(12) United States Patent
Lee (10) Patent No.: US 6,830,073 B2
(45) Date of Patent: Dec. 14, 2004

(54) FOUR-WAY REVERSING VALVE (75) Inventor: Yun-boon Lee, Incheon (KR)

(73) Assignee: Aser Tech Co., Ltd., Seoul (KR)

( * ) Notice: Subject to any disclaimer, the term of this patent is extended or adjusted under 35 U.S.C. 154(b) by 149 days.

(21) Appl. No.: 10/208,999

(22) Filed: Jul. 31, 2002

(65) Prior Publication Data
US 2003/0159738 A1 Aug. 28, 2003

(30) Foreign Application Priority Data

Feb. 27, 2002 (KR) ......................................... 2002-10527

(51) Int. Cl.[7] ............................................. F16K 11/10
(52) U.S. Cl. ..................................... 137/625.43; 251/59
(58) Field of Search ......................... 137/625.43; 251/59

(56) References Cited

U.S. PATENT DOCUMENTS 4,203,469 A * 5/1980 Gates .................... 137/625.43
4,655,252 A * 4/1987 Krumhansl ................. 137/595
4,702,088 A * 10/1987 Ozu ......................... 62/324.1
6,125,885 A * 10/2000 Hirata et al. ........... 137/625.43

* cited by examiner

Primary Examiner—John Fox
(74) Attorney, Agent, or Firm—Volpe and Koenig, P.C.

(57) ABSTRACT

A four-way reversing valve includes a valve casing having a plurality of ports through which fluid flows, a valve main body fixedly installed to the valve casing and having a valve chamber in which a plurality of main port connection holes for selectively connecting the ports are formed, a main spool rotatably installed at the valve chamber of the valve main body, for selectively connecting the ports according to a rotation position, and a spool driving unit for reversibly rotating the main spool by using part of fluid supplied through one of the ports in the valve casing. Thus, the number of welding points is minimized by incorporating the overall pilot valves and excluding additional capillary connection for the pilot valves. Also, manufacturing thereof is made easy and, during the manufacturing and use thereof, the rate of breakdown due to defective welding can be remarkably reduced.

9 Claims, 8 Drawing Sheets

FOUR-WAY REVERSING VALVE

BACKGROUND OF THE INVENTION

1. Field of the Invention

The present invention relates to a four-way reversing valve which is one of direction control valves to control the direction of flow of liquid in a hydraulic or pneumatic circuit and is used, for example, to change the flow of coolant when a cooling or heating operation is selected in a heat pump air conditioning system for a double use of cooling and heating, and particularly, is configured as a solenoid hydraulic operating type using an inner pilot method by incorporating a solenoid-controlled pilot-operated valve and a vane type spool valve which is operated by pilot hydraulic pressure of the solenoid-controlled pilot-operated valve.

2. Description of the Related Art

A heat pump air conditioning system for a double use of cooling and heating uses a heat transfer mechanism performed during a cycle formed of compression, condensation, expansion, and evaporation of coolant and generates cold or hot air flow needed for cooling or heating through heat exchange between the condensation and evaporation steps. Theoretically, the cooling operation or heating operation in such a system could be selected by switching the position of heat exchangers (a condenser and an evaporator) used in the condensation and evaporation steps, respectively. However, switching the positions of the condenser and the evaporator is practically impossible. Thus, the flow of coolant with respect to the condenser and evaporator is changed by using a four-way reversing valve that is one of direction control valves.

Figure 1:
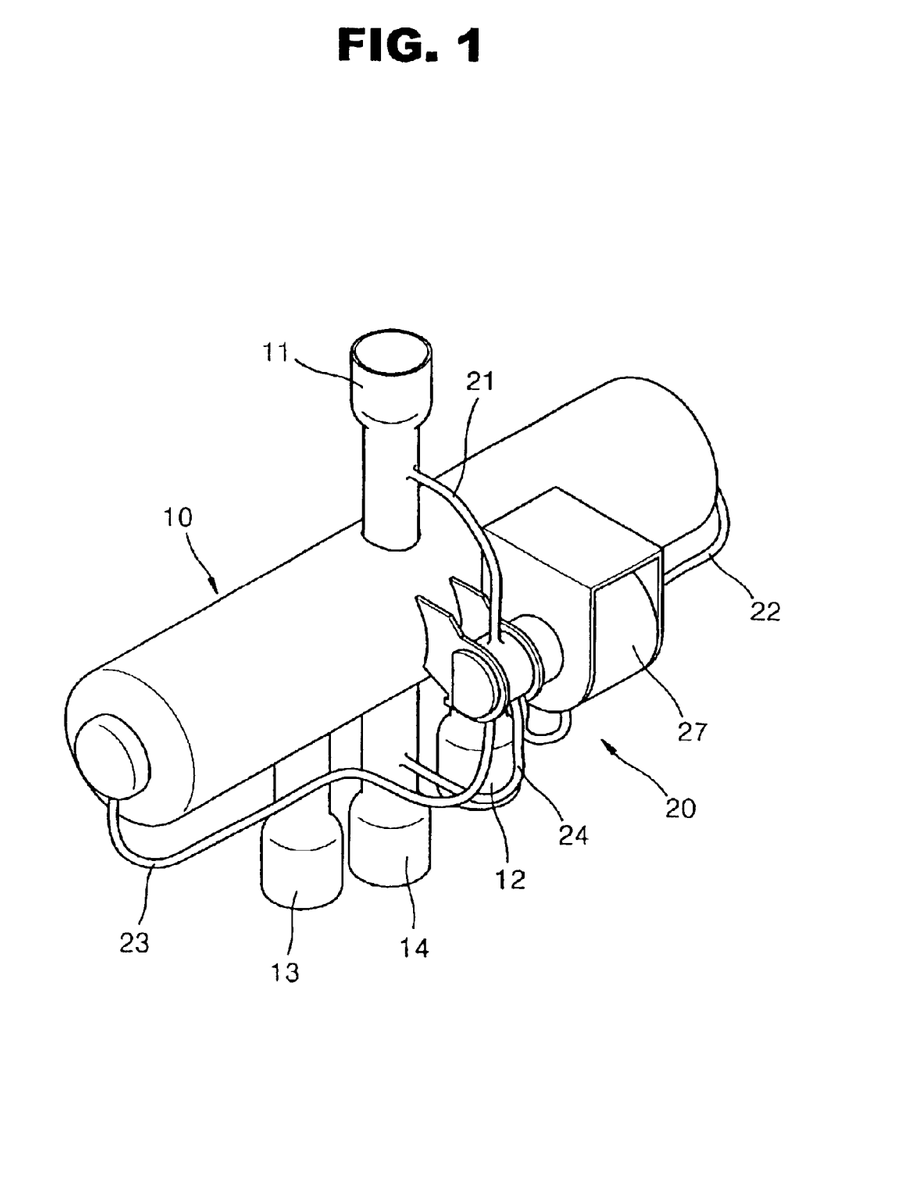
FIG. 1 is a perspective view of a conventional inner pilot type solenoid hydraulic pressure operated four-way reversing valve.

A conventional four-way reversing valve used for the cooling/heating operation of a heat pump air conditioning system for a double use of cooling and heating, as shown in FIG. 1, is an inner pilot type four-port two-position solenoid-hydraulic operated direction control valve combined with a main valve 10 and a pilot valve 20. The main valve 10 has four ports and two pilot connection holes located at both left and right ends of the main valve 10. Four coolant connection pipes 11, 12, 13, and 14 connected to an outlet and an inlet of a compressor and coolant pipes of indoor and outdoor heat exchangers of an air conditioning system are welded at the main valve 10. Also, the pilot valve 20 is combined with the main valve 10 into an inner pilot type through four capillary pipes 21, 22, 23, and 24. Reference numeral 27 denotes a solenoid coil for controlling the pilot valve 20.

Figure 2A:
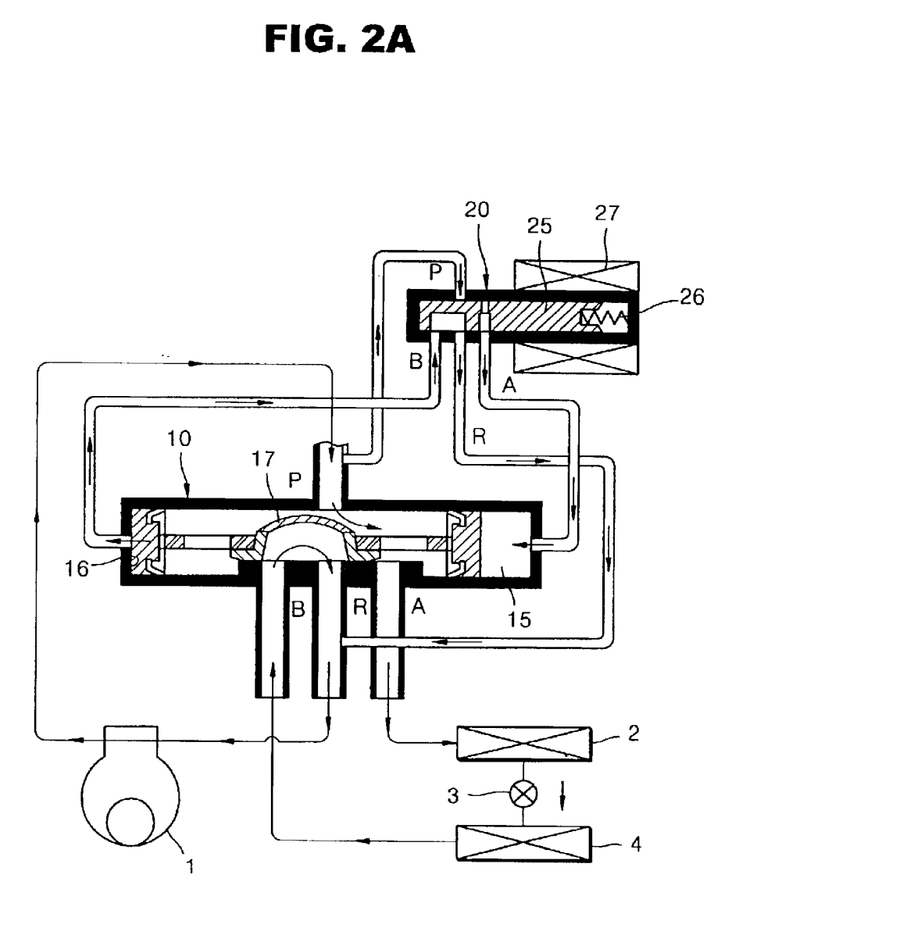
FIGS. 2A and 2B are coolant circuit views for cooling operation and heating operation of a heat pump air conditioning system for a double use of cooling and heating adopting the conventional four-way reversing valve.
Figure 2B:
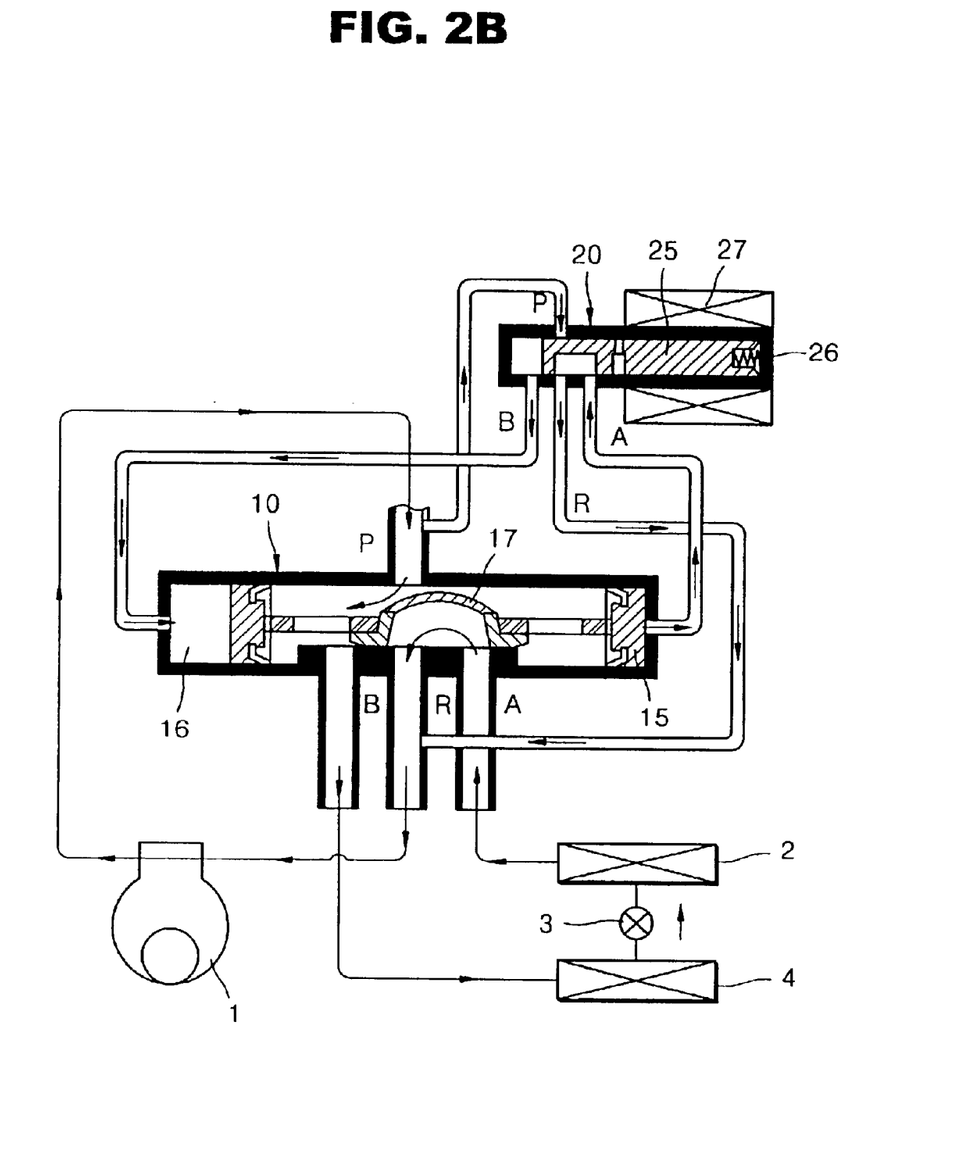

FIGS. 2A and 2B show the conventional four-way reversing valve together with an air conditioning system circuit. Referring to the drawings, the pilot valve 20 combined with the main valve 10 is a four-port two-position spring offset solenoid operated type. A pilot spool 25 is moved to a normal position by a spring 26 and a converting position by an electromagnetic force obtained by exciting the solenoid coil 27 so that one of load ports A and B of the pilot valve 20 is connected to a supply port P while the remaining load port is connected to a drain port R. The exciting current of the solenoid coil 27 is blocked when a cooling operation of an air conditioning system is selected. After a heating operation is selected, the exciting current of the solenoid coil 27 is continuously applied during the operation.

That is, when the cooling operation is selected, the pilot spool 25 is positioned at the normal position as shown in FIG. 2A. Here, pilot pressure in a chamber 15 at one side of the main valve 10 is higher than the other side of the main valve 10. Then, a main spool 17 of the main valve 10 is moved to the left and a supply port P of the main valve 10 is connected to a load port A thereof. A load port B of the main valve 10 is connected to a drain port R thereof. Thus, in the air conditioning system, coolant exhausted from an outlet of a compressor 1 is transferred to an outdoor heat exchanger 2 through the ports P and A of the main valve 10 so that the outdoor heat exchanger 2 works as a condenser. The coolant depressurized by an expansion mechanism 3 is transferred to the indoor heat exchanger 4 so that the indoor heat exchanger 4 works as an evaporator. The coolant is transferred from the indoor heat exchanger 4 to an inlet of the compressor 1 through the port B and R of the main valve 10, thus a cooling cycle is carried out.

Next, when a heating operation is selected, the pilot spool 25 is moved to a converting position by the solenoid coil 27, as shown in FIG. 2B. Here, pilot pressure in a chamber 16 at the other side of the main valve 10 is higher than the chamber 15. Then, the main spool 17 of the main valve 10 is moved to the right and the supply port P is connected to the load port B. The load port A at the other side of the load is connected to the drain port R. Thus, in the air conditioning system, the coolant exhausted from the outlet of the compressor 1 is transferred to the indoor heat exchanger 4 through the ports P and B of the main valve 10 so that the indoor heat exchanger 4 works as a condenser. The coolant depressurized by the expansion mechanism 3 is transferred to the outdoor heat exchanger 2 so that the outdoor heat exchanger 2 works as an evaporator. The coolant is transferred from the outdoor heat exchanger 2 to the inlet of the compressor 1 through the port A and R of the main valve 10, thus a heating cycle is carried out.

In the meantime, Korean Registration Utility Model Publication Nos. 0127597, 0130152, and 20-0213450 and Korean Patent Publication No. 2001-0007231 disclose various types of main valve operating means in which a slide type spool of the main valve is directly converted by using a thermodynamic piston mechanism, instead of the above-descried pilot valve, or a rotary spool driven by an electric motor is provided at the main valve.

However, the thermodynamic piston mechanism or electric motor for directly driving the main spool is hardly used because converting time is slow and converting operation is inaccurate, and thus the use of such devices results in malfunctions in the operating system.

As a valve used in a hydraulic or pneumatic circuit, a solenoid operated type valve such as the above-described pilot valve is widely used due to its merits of easy control of automatic operation or remote operation and fast and accurate converting time. However, since the solenoid operated type valve utilizes electrical thrust of a solenoid, it is not appropriate for a case of controlling a huge amount of fluid and is usually used for conversion at a pressure of 210 $kg/cm^2$ and the maximum fluid amount of 80 l/min. Accordingly, the conventional four-way reversing valve as described above is generally configured such that the main valve is a hydraulic operating type and the pilot valve operating the main valve is a solenoid operated type.

To manufacture a four-way reversing valve formed by combining the main valve and the pilot valve, capillary pipes whose diameters are small are further provided, in addition to the coolant connection pipes welded at the main valve. Thus, the number of welding points increases so that manufacturing of a four-way reversing valve becomes complicated and breakdown during manufacture and use thereof is frequent due to welding defects.

SUMMARY OF THE INVENTION

To solve the above-described problems, it is an object of the present invention to a four-way reversing valve which is a solenoid operated type exhibiting an easy control and fast and accurate converting time, in which pilot pressure is converted and a vane type main spool is rotated by using the converted pilot pressure, so that the number of welding points are minimized.

To achieve the above object, there is provided a four-way reversing valve which comprises a valve casing having a plurality of ports through which fluid flows, a valve main body fixedly installed to the valve casing and having a valve chamber in which a plurality of main port connection holes for selectively connecting the ports are formed, a main spool rotatably installed at the valve chamber of the valve main body, for selectively connecting the ports according to a rotation position, and a spool driving unit for reversibly rotating the main spool by using part of fluid supplied through one of the ports in the valve casing.

It is preferred in the present invention that the ports of the valve casing comprise a supply port for connecting to a fluid supply source, two load ports for connecting to an external load, and a drain port for draining, the main spool comprises a spool portion for selecting one of the two load ports and a groove passing through the spool portion and connected to the drain port, and the four way reversing valve operates by forming a first main flow path for moving fluid from the supply port to one of the two load ports via the valve chamber, and a second main flow path for moving fluid from the other one of the two load ports to the drain port via the groove.

It is preferred in the present invention that the valve main body further comprises a pilot hydraulic chamber which is formed by extending one side of the valve chamber and has two pilot input and output ports penetrating the pilot hydraulic chamber to alternately input and output the part of fluid in two opposite directions inside the valve casing and a pilot drain port for obtaining a pilot hydraulic pressure, that the main spool further comprises a vane portion formed by extending one side of the main spool to be rotatable between the two pilot input and output ports in the pilot hydraulic chamber, and that the spool driving unit can select one of the two pilot input and output ports.

It is preferred in the present invention that the spool driving unit comprises a solenoid for generating an electrical thrust by being excited by an electric signal, a plunger moved by the electrical thrust of the solenoid, a spring developing an elastic force to return the plunger in an opposite direction to the electrical thrust, and a pilot spool coupled to the plunger, and moving and returning together with the plunger and having a cavity for connecting one of the two pilot input and output ports and the drain port.

According to the present invention, since the main spool is directly rotated by applying pilot hydraulic pressure in the valve main body, the additional capillary pipe needs not be welded unlike the conventional technology.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 3:
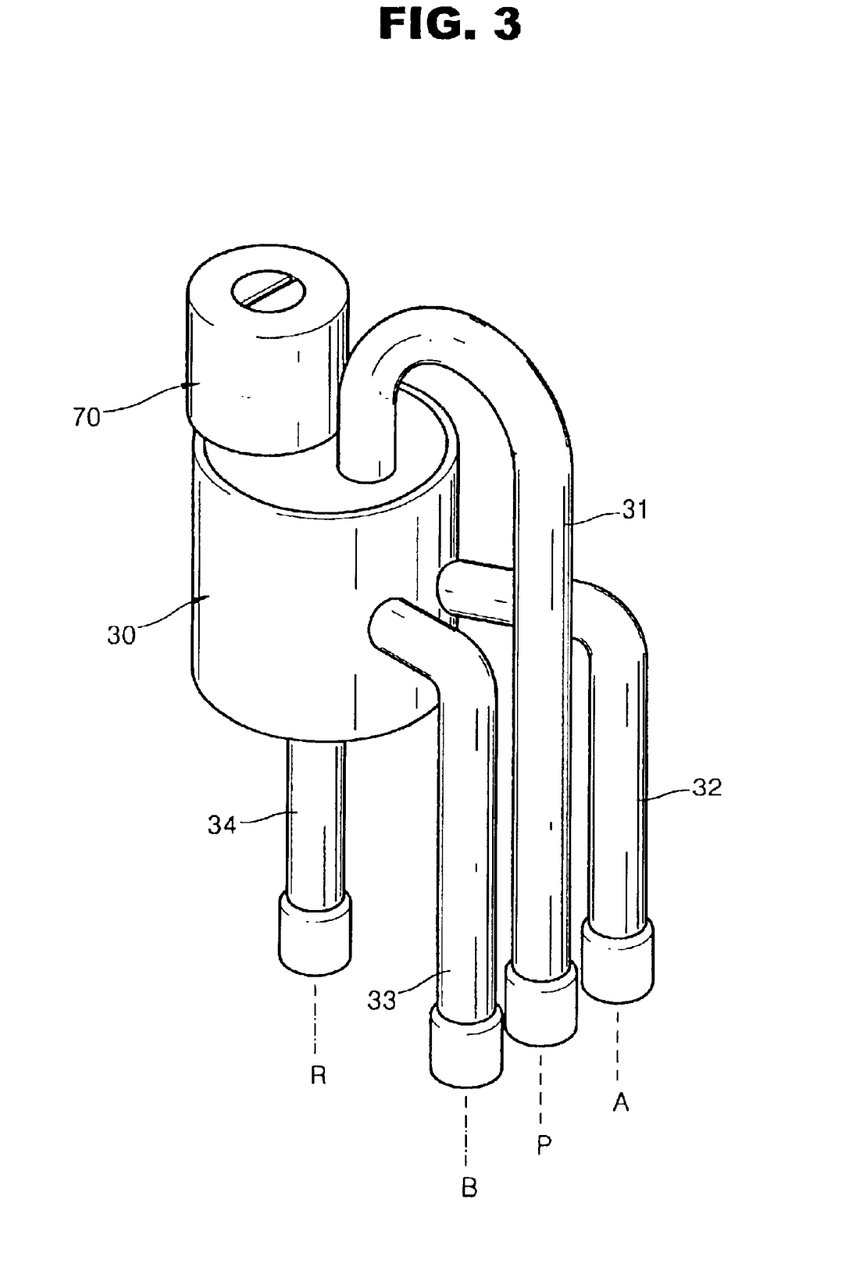
FIG. 3 is a perspective view of a four-way reversing valve according to the present invention.

Referring to FIG. 3, a four-way reversing valve according to the present invention includes a cylindrical valve casing 30. The valve casing 30 has a supply port P formed at one side of the upper surface thereof, two load ports A and B formed with a slight gap between them and placed at the same height on the outer circumferential surface thereof, and a drain port R formed at the center of the lower surface thereof. Coolant connection pipes 31, 32, 33, and 34, connected to the respective portions of an air conditioning system, for example, the outlet and inlet of the compressor and respective coolant pipes of the heat exchangers, are welded at the respective ports and bent properly. Reference numeral 70 denotes a solenoid installed at the upper surface of the valve casing 30. The solenoid is operated to convert the valve by being excited by an electric signal. The electric signal is applied only when the heating operation of an air conditioning system is selected, but not applied when cooling operation is selected.

Figure 4:
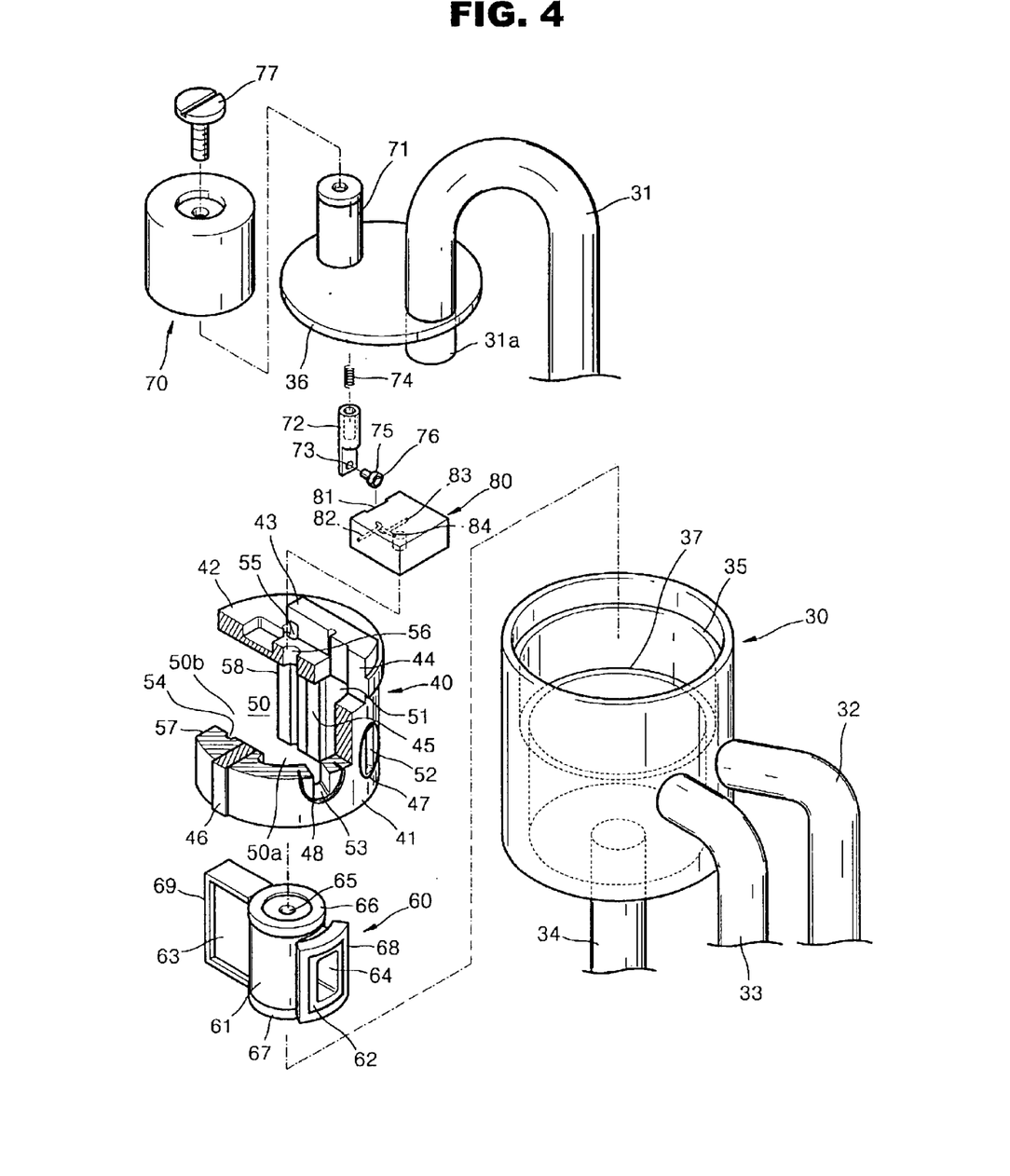
FIG. 4 is an exploded perspective view of the four-way reversing valve according to the present invention.

Referring to FIG. 4, the valve casing 30 is formed into a cup shape by processing metal such as brass. A cap 36 having a disc shape is capped on a hooking step 35 formed at the upper portion of the valve casing 30 and the edge of the cap 36 is welded to seal the cap 36. It is possible to screw together the valve casing 30 and the cap 36 with a separate sealing member so that they can be easily assembled and disassembled.

A valve main body 40 fixedly installed in the valve casing 30 is a mold formed by injecting resin, for example. The valve main body 40 includes a cylindrical body portion 41, a flange portion 42 at the upper portion of the body portion 41, and a block support portion 43 at the upper portion of the flange portion 42. The body portion 41 has a diameter slightly less than the inner circumferential surface of the valve casing 30, so that it can be easily inserted during assembly. The flange portion 42 has such a diameter as to tightly fit to the inner circumferential surface of the valve casing 30, so that it can be placed on a hooking step 37 formed on the inner circumferential surface of the valve casing 30 and fixed thereon. A cut-away portion 44 is formed at one side of the flange portion 42 and the block support portion 43 and accommodates an end portion 31a of a coolant connection pipe 31 penetrating the supply port P formed at the cap 36.

The valve main body 40 has a valve chamber 50a formed in the body portion 41 and a pilot hydraulic chamber 50b formed by extending the side of the valve chamber 50a. The valve chamber 50a is connected to the coolant connection pipe 31 at the support port P through a main port connection hole 51 at the supply's side penetrating the cut-away portion 44 of the flange portion 42 above the valve chamber 50a. Also, the valve chamber 50a can be connected to each of the coolant connection pipes 32 and 33 at the side of load ports A and B through main port connection holes 52 and 53 at the load's side penetrating a wall surface of the body portion 41. The pilot hydraulic chamber 50b is formed by cutting the wall surface and bottom surface of the body portion 41 to secure a sufficient space and thus encompassed by the wall surface and bottom surface of the inner circumference of the valve casing 30 exposed thereto and fixed vanes 57 and 58 at both ends of the cut portion. Two pilot input ports 54 and 55 respectively formed along the wall surface at the side of the fixed vanes 57 and 58 and above the flange portion 42 penetrate the pilot hydraulic chamber 50b. A pilot drain port 56 of the pilot hydraulic chamber 50b penetrates the center of the flange portion 42 to be always connected to a second flow path of the main spool 60 which is described later.

The body portion 41 of the valve main body 40 is cut in a diametric direction between the valve chamber 50a and the pilot hydraulic chamber 50b and seal blocks 45 and 46 are inserted in the cut portion. The seal blocks 45 and 46 maintain sealing with respect to a boss portion 61 of the main spool 60 which is described later by the inner end portions thereof and the inner circumferential surface of the valve casing 30 by the outer end portions thereof, so that the valve chamber 50a and the pilot hydraulic chamber 50b are separated into sealed spaces. Seal rings 47 and 48 installed around the main port connection holes 52 and 53 at the load's side on the outer circumferential surface of the body portion 41 in a half-embedded state closely contact the load ports A and B penetrating the inner circumferential surface of the valve casing 30 to maintain a sealing state. The seal blocks 45 and 46 and the seal rings 47 and 48 are formed of a material exhibiting a high mechanical and sealing feature, for example, Teflon based resin.

The main spool 60 is formed of a cylindrical boss portion 61, a spool portion 62 extending from one side of the boss portion 61 and accommodated in the valve chamber 50a, a vane portion 63 extending from the other side of the boss portion 61 and accommodated in the pilot hydraulic chamber 50b, and a groove 64 formed from the end of the spool portion 62 to the lower end portion of the boss portion 61. The groove 64 at the end of the spool portion 62 is connected to the load port A or B through one of the main port connection holes 52 and 53 at the load's side of the valve main body 40 and always connected to the drain port R of the bottom of the valve casing 30 at the lower end portion of the boss portion 61, thus forming the second main flow path. Also, a drain connection hole 65 for connecting the pilot drain port 56 of the valve main body 40 to the groove 64 is formed by penetrating the upper end portion of the boss portion 61 of the main spool 60.

Sealing rings 66 and 67 formed of Teflon-based resin are coupled to the upper and lower end portions of the boss portion 61 of the main spool 60 to seal around the drain connection hole 65 penetrating the flange portion 42 of the valve main body 40 and around the drain portion R at the bottom of the valve casing 30. Seal members 68 and 69 formed of Teflon-based resin are coupled to the end portion of the spool portion 62 to maintain sealing with the inner circumferential wall surface at the side of the valve chamber 50a and to the edge of the vane portion 63 to maintain sealing with the ceiling of the pilot hydraulic chamber 50b and the inner circumferential wall surface and the bottom surface of the valve casing 30.

Next, the solenoid 70, a stem 71, a plunger 72, a pilot spool 75, and a spool seat block 80 are provided as a pilot hydraulic converting means. The solenoid 70 is inserted around the stem 71 and fixed by a screw 77. An end portion of the stem 71 penetrates the cap 36 so that the stem 71 is fixedly welded on the cap 36 to erect thereon. The plunger 72 is inserted in the stem 71 together with a spring 74 and always protrudes toward a normal position (refer to FIG. 6A) in a spring offset manner. When the solenoid 70 is excited, the plunger 72 is pulled to a converting position (refer to FIG. 6B) by an electrical thrust. The pilot spool 75 has a concave cavity 76 and is inserted into a groove 73 formed in an end portion of the plunger 72. the pilot spool 75 closely contacts a seat surface 81 of the spool seat block 80 and slides thereon and moves together with the plunger 72.

The spool seat block 80 accommodated on the block support portion 43 of the valve main body 40 is manufactured by processing metal such as brass and has three pilot port connection holes 82, 83, and 84 formed in the seat surface 81 which are open with an interval in a vertical direction, that is, in a direction in which the plunger 72 moves. The interval between two neighboring ones of the three pilot port connection holes 82, 83, and 84 is less than the diameter of the cavity 76 of the pilot spool 75 and the length between the uppermost pilot port connection hole 82 and the lowermost pilot port connection hole 83 is greater than the diameter of the cavity 76. That is, when the pilot spool 75 is in a normal position, the lower two neighboring pilot port connection holes 83 and 84 are connected by the cavity 76 of the pilot spool 75 and the uppermost pilot port connection hole 82 is exposed outside the cavity 76 (referring to FIG. 6A). At the converting position, the upper two neighboring pilot port connection holes 82 and 84 are connected by the cavity 77 of the pilot spool 75 and the lowermost pilot port connection hole 83 is exposed.

The two uppermost and lowermost pilot port connection holes 82 and 83 of the pilot port connection holes 82, 83, and 84 of the spool seat block 80 are connected to the two pilot input ports 54 and 55 formed in the valve main body 40 and the other pilot port connection hole 84 is connected to the pilot drain port 56.

Figure 5:
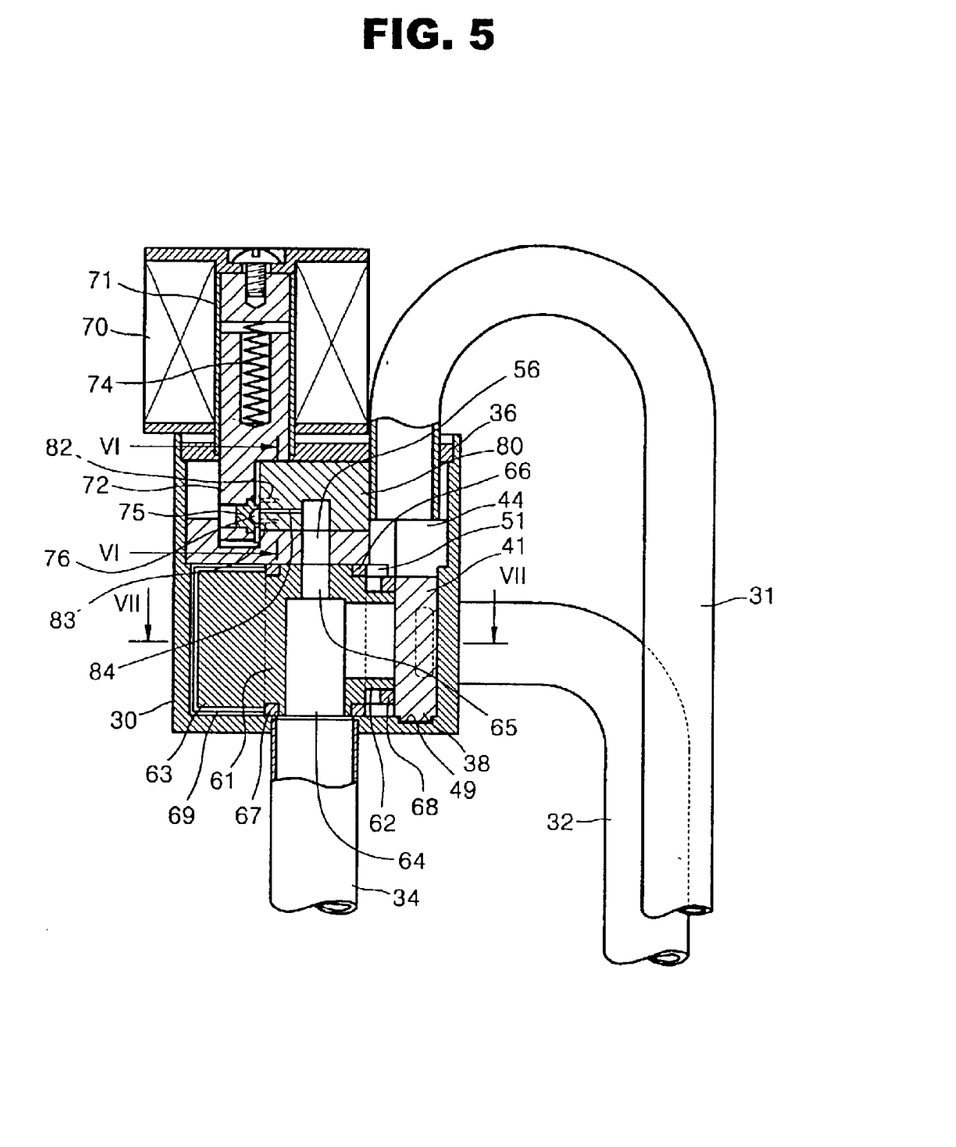
FIG. 5 is a vertical sectional view of the four-way reversing valve according to the present invention.

In FIG. 5, reference numerals 38 and 49 denote a concave groove and a protrusion correspondingly formed to guide an assembly position when the valve main body 40 is assembled to the valve casing 30.

In the operation of the four-way reversing valve according to the present invention, referring to FIG. 5, most of fluid (coolant) supplied through the coolant connection pipe 31 at the side of supply port P flows into the valve chamber 50a through the port connection hole 51 at the supply's side. Part of the fluid flows into a space at the upper side of the flange portion 42 of the valve main body 40 along a gap provided at the inner circumferential surface of the valve casing 30 and further enters in the one side of the pilot hydraulic chamber 50b through one of the two pilot port connection holes 82 and 83 of the spool seat block 80 exposed to the space.

Figure 6A:
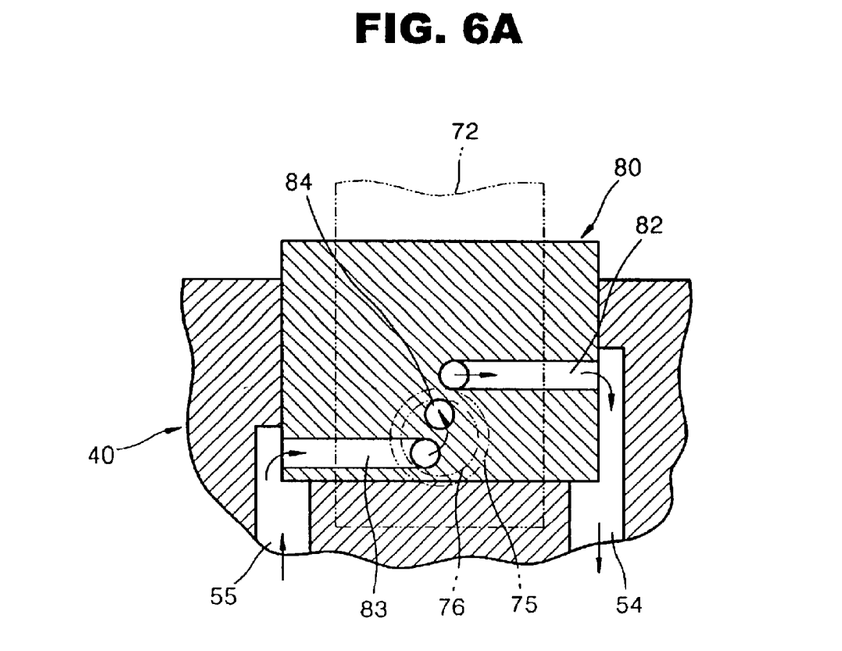
FIGS. 6A and 6B are sectional views taken along line VI—VI of FIG. 5, showing a pilot spool converting state of the four-way reversing valve according to the present invention.

When the solenoid 70 is not in an excited state, the plunger 72 protrudes downward by the spring 74, that is, at the normal position on the seat surface 81 of the spool seat block 80. When the pilot spool 75 is positioned at the normal position, as shown in FIG. 6A, the lower two pilot port connection holes 83 and 84 of the three pilot port connection holes 82, 83, and 84 formed in the spool seat block 80 are connected by the cavity 76 of the pilot spool 75 and the uppermost pilot port connection hole 82 is exposed. Thus, part of the fluid supplied from the supply port P flows in the exposed uppermost pilot port connection hole 82 and moves toward the pilot hydraulic chamber 50b through the pilot input port 54 at one side connected thereto.

The fluid input to the pilot hydraulic chamber 50b through the pilot input port 54 at one side applies pressure to the vane portion 63 of the main spool 60 from the fixed vane 57 at one side toward the fixed vane 58 at the other side, so that the entire main spool 60 rotates clockwise.

Figure 7A:
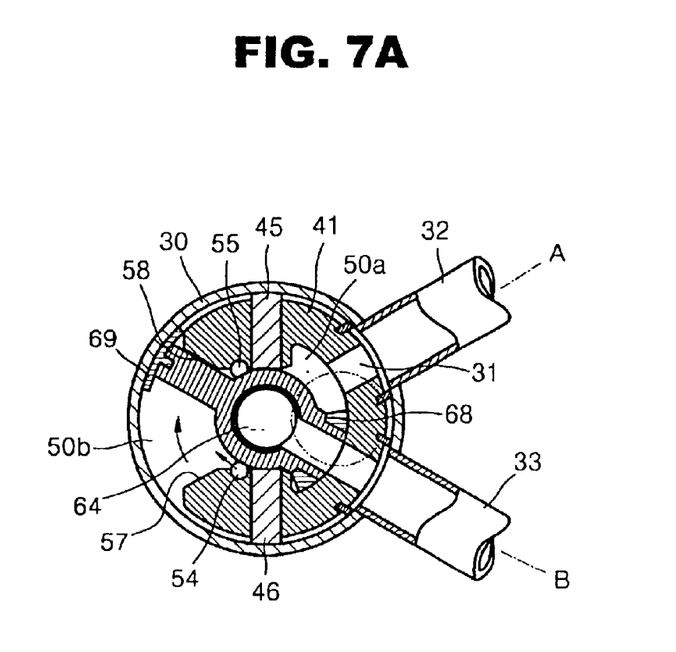
FIGS. 7A and 7B are sectional views taken along line VII—VII of FIG. 5, showing a main spool converting state of the four-way reversing valve according to the present invention

When the main spool 60 is rotated clockwise, as shown FIG. 7A, the load port A at one side of the two load ports A and B is connected to the valve chamber 50a, forming a first main flow path. Also, the load port B at the other side is connected to the drain port R through the groove 64 of the main spool 60, forming a second main flow path. Thus, the air conditioning system is set to perform a cooling operation.

In the meantime, during the clockwise rotation of the main spool 60, the fluid remaining in the clockwise direction of the vane portion 63 in the pilot hydraulic chamber 50b is exhausted through the pilot input port 55 at the other side formed in the main spool 60. As shown in FIG. 6A, the remaining fluid proceeds via the pilot port connection hole 83 connected to the pilot input port 55, the cavity 76 of the pilot spool 75, and the pilot port connection hole 84. Then, as shown in FIG. 5, the fluid sequentially passes the pilot drain port 56 of the valve main body 40 and the drain connection hole 65 of the main spool 60, and is guided toward the groove 64 of the main spool 60 forming the second main flow path. The fluid joins the main stream of the fluid flowing along the second main flow path of the groove 64 and then is drained.

Figure 6B:
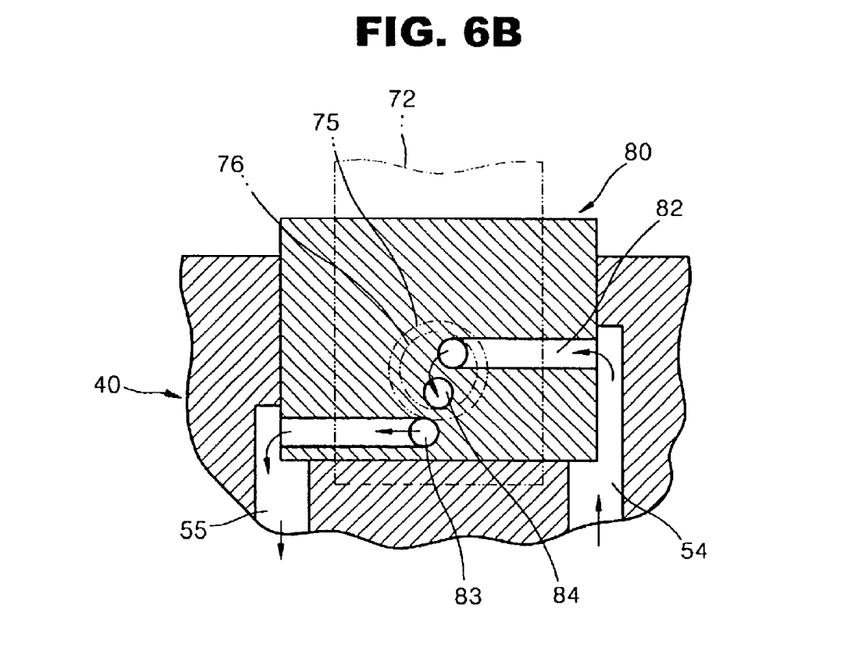

Next, when the solenoid 70 is excited, the plunger 72 is pulled upward by an electrical thrust according to the excitation of the solenoid 70. Here, as shown in FIG. 6B, the pilot spool 75 is located at the converting position on the seat surface 81 of the spool seat block 80. When the pilot spool 75 is positioned at the converting position, the upper two pilot port connection holes 82 and 84 of the three pilot port connection holes 82, 83, and 84 formed in the spool seat block 80 are connected by the cavity 76 of the pilot spool 75 and the lowermost pilot port connection hole 83 is exposed. Thus, part of the fluid supplied from the supply port P flows in the exposed lowermost pilot port connection hole 83 and moves toward the other side of the pilot hydraulic chamber 50b through the pilot input port 55 connected thereto.

The fluid input to the pilot hydraulic chamber 50b through the pilot input port 55 at the other side applies pressure to the vane portion 63 of the main spool 60 from the fixed vane 57 at the other side toward the fixed vane 58 at one side, so that the entire main spool 60 rotates counterclockwise.

Figure 7B:
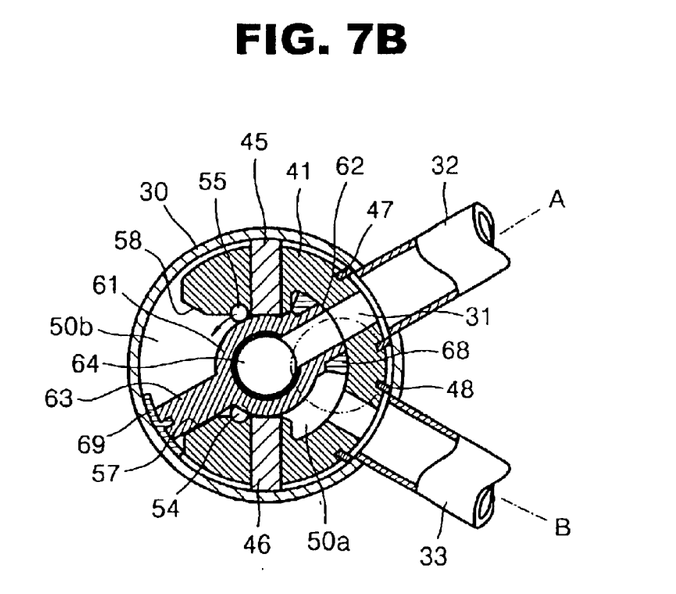

When the main spool 60 is rotated counterclockwise, as shown FIG. 7B, the load port B at the other side of the two load ports A and B is connected to the valve chamber 50a, forming a first main flow path. Also, the load port A at one side is connected to the drain port R through the groove 64 of the main spool 60, forming a second main flow path. Thus, the air conditioning system is set to perform a heating operation.

In the meantime, during the counterclockwise rotation of the main spool 60, the fluid remaining in the counterclockwise direction of the vane portion 63 in the pilot hydraulic chamber 50b is exhausted through the pilot input port 54 at one side formed therein. As shown in FIG. 6A, the remaining fluid proceeds via the pilot port connection hole 82 connected to the pilot input port 54, the cavity 76 of the pilot spool 75, and the pilot port connection hole 84. Then, as shown in FIG. 5, the fluid sequentially passes the pilot drain port 56 of the valve main body 40 and the drain connection hole 65 of the main spool 60, and is guided toward the groove 64 of the main spool 60 forming the second main flow path. The fluid joins the main stream of the fluid flowing along the second main flow path of the groove 64 and then is drained.

As described above, the four-way reversing valve according to the present invention includes a vane type main spool as a solenoid-hydraulic-rotation operating type. Since a solenoid operated type pilot valve of an inner pilot type to operate the vane type main spool is incorporated into the valve main body in a casing, only the connection pipes corresponding to the main port need to be welded at the valve casing. Therefore, the number of welding points can be minimized and manufacturing thereof is made easy. Further, during the manufacturing and use thereof, the rate of breakdown due to defective welding can be remarkably reduced.

Although the present invention is described as being used for a heat pump air conditioning system for a double use of cooling and heating in the above preferred description, it is not limited to the use thereof and the accompanying drawings. That is, the number of ports can be changed according to products to which the present invention is applied. Also, the solenoid operated type pilot valve for the operation of the vane type main spool or the structure of the vane can be realized in various ways.

What is claimed is:

1. A four-way reversing valve comprising:
   a valve casing having a plurality of ports through which fluid flows;
   a valve main body fixedly installed to the valve casing and having a valve chamber in which a plurality of main port connection holes for selectively connecting the ports are formed;
   a main spool rotatably installed at the valve chamber of the valve main body, for selectively connecting the ports according to a rotation position; and
   a spool driving unit for reversibly rotating the main spool by using part of fluid supplied through one of the ports in the valve casing, wherein the ports of the valve casing comprise a supply port for connecting to a fluid supply source, two load ports for connecting to an external load, and a drain port for draining, the main spool comprises a spool portion for selecting one of the two load ports and a groove passing through the spool portion and connected to the drain port, and the four way reversing valve operates by forming a first main flow path for moving fluid from the supply port to one of the two load ports via the valve chamber, and a second main flow path for moving fluid from the other one of the two load ports to the drain port via the groove.

2. The four-way reversing valve as claimed in claim 1, wherein the valve main body further comprises a pilot hydraulic chamber which is formed by extending one side of the valve chamber and has two pilot input and output ports penetrating the pilot hydraulic chamber to alternately input and output the part of fluid in two opposite directions inside the valve casing and a pilot drain port for obtaining a pilot hydraulic pressure,
   the main spool further comprises a vane portion formed by extending one side of the main spool to be rotatable between the two pilot input and output ports in the pilot hydraulic chambers, and
   the spool driving unit comprises a solenoid for generating an electrical thrust by being excited by an electric signal, a plunger moved by the electrical thrust of the solenoid, a spring developing an elastic force to return the plunger in an opposite direction to the electrical thrust, and a pilot spool coupled to the plunger, and moving and returning together with the plunger and having a cavity for connecting one of the two pilot input and output ports and the drain port.

3. The four-way reversing valve as claimed in claim 2, further comprising a spool seat block coupled to the valve main body and having a plane spool seat surface and three pilot port connection holes formed therein, open to the spool seat surface, and connecting the two pilot input and output ports and the pilot drain port, and the pilot spool contacts the spool seat surface of the spool seat block and moves to connect the pilot port connection holes.

4. The four-way reversing valve as claimed in claim 2, wherein the spool driving unit further comprises a stem for accommodating the plunger and the spring and supporting the solenoid, the stem being fixed to penetrate outward the valve casing.

5. The four-way reversing valve as claimed in claim 1, wherein a coolant connection pipe for connecting a coolant pipe of an air conditioning system is welded at each of the ports of the valve casing.

6. A four-way reversing valve comprising:
a valve casing having a plurality of ports through which fluid flows;
a valve main body fixedly installed to the valve casing and having a valve chamber in which a plurality of main port connection holes for selectively connecting the ports are formed;
a main spool rotatably installed at the valve chamber of the valve main body, for selectively connecting the ports according to a rotation position; and
a spool driving unit for reversibly rotating the main spool by using part of fluid supplied through one of the ports in the valve casing, wherein the valve main body further comprises a pilot hydraulic chamber which is formed by extending one side of the valve chamber and has two pilot input and output ports penetrating the pilot hydraulic chamber to alternately input and output the part of fluid in two opposite directions inside the valve casing and a pilot drain port for obtaining a pilot hydraulic pressure,
the main spool further comprises a vane portion formed by extending one side of the main spool to be rotatable between the two pilot input and output ports in the pilot hydraulic chamber, and
the spool driving unit comprises a solenoid for generating an electrical thrust by being excited by an electric signal, a plunger moved by the electrical thrust of the solenoid, a spring developing an elastic force to return the plunger in an opposite direction to the electrical thrust, and a pilot spool coupled to the plunger, and moving and returning together with the plunger and having a cavity for connecting one of the two pilot input and output ports and the drain port.

7. The four-way reversing valve as claimed in claim 6, further comprising a spool seat block coupled to the valve main body and having a plane spool seat surface and three pilot port connection holes formed therein, open to the spool seat surface, and connecting the two pilot input and output ports and the pilot drain port, and the pilot spool contacts the spool seat surface of the spool seat block and moves to connect the pilot port connection holes.

8. The four-way reversing valve as claimed in claim 6, wherein the spool driving unit further comprises a stem for accommodating the plunger and the spring and supporting the solenoid, the stem being fixed to penetrate outward the valve casing.

9. A four-way reversing valve comprising:
a valve casing having a plurality of ports through which fluid flows;
a valve main body fixedly installed to the valve casing and having a valve chamber in which a plurality of main port connection holes for selectively connecting the ports are formed;
a main spool rotatably installed at the valve chamber of the valve main body, for selectively connecting the ports according to a rotation position; and
a spool driving unit for reversibly rotating the main spool by using part of fluid supplied through one of the ports in the valve casing, wherein the hydraulic chamber of the valve main body is open to a wall surface and a bottom surface of the inner circumference of the valve casing, and the vane portion of the main spool rotates as the vane portion directly contacts the exposed wall surface and the bottom surface of the inner circumference of the valve casing and maintains sealing.

* * * * *